US011228425B2

(12) United States Patent
Wu (10) Patent No.: US 11,228,425 B2
(45) Date of Patent: *Jan. 18, 2022

(54) DATA STORAGE METHOD, DATA QUERY METHOD AND APPARATUSES

(71) Applicant: ADVANCED NEW TECHNOLOGIES CO., LTD., Grand Cayman (KY)

(72) Inventor: Hao Wu, Chengdu (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/202,169

(22) Filed: Mar. 15, 2021

(65) Prior Publication Data

US 2021/0203480 A1 Jul. 1, 2021

Related U.S. Application Data (63) Continuation of application No. 16/139,887, filed on Sep. 24, 2018, now Pat. No. 10,985,908.

(30) Foreign Application Priority Data

Sep. 29, 2017 (CN) .......................... 201710910293.0

(51) Int. Cl.
*G06F 21/60* (2013.01)
*H04L 9/06* (2006.01)
(Continued)

(52) U.S. Cl.
CPC .......... *H04L 9/0637* (2013.01); *G06F 16/903* (2019.01); *G06F 21/602* (2013.01);
(Continued)

(58) Field of Classification Search
CPC . H04L 9/08; H04L 9/0825; H04L 9/06; H04L 9/0637; H04L 9/0643; H04L 9/32;
(Continued)

(56) References Cited

U.S. PATENT DOCUMENTS 7,904,392 B2 3/2011 Namba
9,397,985 B1 7/2016 Seger, II et al.
(Continued)

FOREIGN PATENT DOCUMENTS

CN 102496046 A 6/2012
CN 105488431 A 4/2016
(Continued)

OTHER PUBLICATIONS

PCT International Search Report and the Written Opinion dated Dec. 19, 2018, issued in related International Application No. PCT/US2018/052429 (15 pages).
(Continued)

*Primary Examiner* — Kristine L Kincaid
*Assistant Examiner* — Shaqueal D Wade-Wright (57) ABSTRACT

A data storage method comprises receiving, from a first blockchain node associated with a blockchain, a query for encrypted data stored in the blockchain, wherein the encrypted data is shared by a second blockchain node; determining, through one or more smart contracts, whether the first blockchain node has a permission to decrypt the encrypted data; if the first blockchain node has the permission: sending the encrypted data to an encryption device to decrypt the encrypted data and return data obtained from the decryption to the first blockchain node; determining, through the smart contracts, a reward value to be added to an account of the second blockchain node; and sending a node identifier of the second blockchain node and the reward value to blockchain nodes of the blockchain, enabling each
(Continued)

US 11,228,425 B2

Page 2 of the blockchain nodes to store the node identifier and the reward value in the blockchain.

20 Claims, 6 Drawing Sheets

(51) Int. Cl.
*H04L 9/32* (2006.01)
*G06F 16/903* (2019.01)
*G06F 21/64* (2013.01)
*G06F 21/62* (2013.01)

(52) U.S. Cl.
CPC .......... *G06F 21/604* (2013.01); *G06F 21/64* (2013.01); *H04L 9/32* (2013.01); *H04L 9/3236* (2013.01); *H04L 9/3297* (2013.01); *G06F 21/6227* (2013.01); *H04L 2209/38* (2013.01); *H04L 2209/56* (2013.01)

(58) Field of Classification Search
CPC ... H04L 9/3247; H04L 9/3213; H04L 9/3236; G06F 21/53; G06F 21/45; G06F 21/6227; G06F 21/604; G06F 21/64; G06F 16/903
See application file for complete search history.

(56) References Cited

U.S. PATENT DOCUMENTS

| | | | |
|---|---|---|---|
| 9,635,000 | B1 | 4/2017 | Muftic |
| 9,774,578 | B1 | 9/2017 | Ateniese et al. |
| 10,097,344 | B2 | 10/2018 | Davis |
| 2015/0244690 | A1 | 8/2015 | Mossbarger |
| 2015/0310424 | A1 | 10/2015 | Myers |
| 2015/0371224 | A1 | 12/2015 | Lingappa |
| 2015/0379510 | A1* | 12/2015 | Smith ................ G06Q 20/3829 705/71 |
| 2016/0086175 | A1 | 3/2016 | Finlow-Bates et al. |
| 2016/0217436 | A1 | 7/2016 | Brama |
| 2016/0260169 | A1 | 9/2016 | Arnold et al. |
| 2016/0261690 | A1 | 9/2016 | Ford |
| 2016/0330027 | A1 | 11/2016 | Ebrahimi |
| 2016/0342978 | A1 | 11/2016 | Davis et al. |
| 2016/0342989 | A1 | 11/2016 | Davis |
| 2016/0342994 | A1* | 11/2016 | Davis ................ G06Q 20/4014 |
| 2016/0344543 | A1 | 11/2016 | Alness et al. |
| 2016/0350749 | A1 | 12/2016 | Wilkins et al. |
| 2017/0031676 | A1 | 2/2017 | Cecchetti et al. |
| 2017/0046651 | A1 | 2/2017 | Lin et al. |
| 2017/0046792 | A1 | 2/2017 | Haldenby et al. |
| 2017/0140408 | A1 | 5/2017 | Wuehler |
| 2017/0147808 | A1 | 5/2017 | Kravtiz |
| 2017/0177898 | A1 | 6/2017 | Dillenberger |
| 2017/0243241 | A1 | 8/2017 | Boutelle et al. |
| 2017/0264428 | A1 | 9/2017 | Seger, II |
| 2017/0300898 | A1 | 10/2017 | Campero et al. |
| 2017/0344988 | A1 | 11/2017 | Cusden et al. |
| 2017/0352027 | A1 | 12/2017 | Zhang et al. |
| 2018/0144340 | A1* | 5/2018 | Kinnaird ............ G06Q 20/3829 |
| 2018/0241551 | A1 | 8/2018 | Fujimura et al. |
| 2018/0316492 | A1* | 11/2018 | Ramachandran ..... H04L 9/3239 |
| 2018/0343114 | A1* | 11/2018 | Ben-Ari .................... H04L 9/06 |
| 2019/0019183 | A1 | 1/2019 | Karame et al. |
| 2019/0065733 | A1 | 2/2019 | Forehand |
| 2019/0081796 | A1 | 3/2019 | Chow et al. |
| 2019/0141045 | A1 | 5/2019 | Stocker |
| 2019/0280855 | A1 | 9/2019 | Tong |
| 2019/0296915 | A1* | 9/2019 | Lancashire ........ G06Q 20/3825 |
| 2019/0342078 | A1 | 11/2019 | Li |
| 2020/0136815 | A1* | 4/2020 | Trevethan ................ H04L 9/30 |
| 2020/0374135 | A1* | 11/2020 | Lu .......................... H04L 9/008 |

FOREIGN PATENT DOCUMENTS

| | | |
|---|---|---|
| CN | 106485167 A | 3/2017 |
| CN | 106548330 A | 3/2017 |
| CN | 106651346 A | 5/2017 |
| CN | 106960388 A | 7/2017 |
| CN | 106991334 A | 7/2017 |
| CN | 107018125 A | 8/2017 |
| TW | M544675 U | 7/2017 |
| WO | 2017/007806 A1 | 1/2017 |

OTHER PUBLICATIONS

Kishigami Junichi, et al., "The Blockchain-Based Digital Content Distribution System", 2015 IEEE Fifth International Conference on Big Data and Cloud Computing, IEEE, Aug. 26, 2015, pp. 187-190.
Non-final rejection and Search Report for Taiwanese Application No. 107115873 dated Apr. 10, 2019 (8 pages).
Decision to reject for Taiwanese Application No. 107115873 dated Aug. 16, 2019 (4 pages).
Written Opinion of the International Preliminary Examining Authority dated Sep. 10, 2019, issued in related International Application No. PCT/US2018/052429 (6 pages).
First Search Report for Chinese Application No. 201710910293.0 dated Feb. 19, 2020.
First Office Action for Chinese Application No. 201710910293.0 dated Feb. 27, 2020.
International Preliminary Report on Patentability for PCT Application No. PCT/US2018/052429 dated Mar. 30, 2020.
Preinterview first office action for U.S. Appl. No. 16/744,079 dated Apr. 6, 2020.
Notice of Allowance for U.S. Appl. No. 16/744,079 dated Sep. 1, 2020.
Chengjun Cai et al., Towards Trustworthy and Private Keyword Search in Encrypted Decentralized Storage, May 21-25, 2017, IEEE, pp. 1-7. (Year:2017).
Ahmed Kosba et al., Hawk—The Blockchain Model of Cryptography and Privacy-Preserving Smart Contracts, May 22-26, 2016, IEE, pp. 839-858. (Year: 2016).
Alejandro F. et al., Cryptocurrency as Guarantees of Origin: Simulating a Green Certificate market with the Ethereum Blockchain, Aug. 14-17, 2017, IEEE, pp. 367-372 (Year: 2017).
Staples, M. et al., Risks and Opportunities for Systems Using Blockchain and Smart Contract, May 2017, CSIRO, pp. 1-60. (Year: 2017).
Supplementary Search for Chinese Application No. 201710910293.0 dated Jun. 11, 2020.
Search Report and Written Opinion for Singapore Application No. 11202002834X dated Feb. 17, 2019, 8 pages.
Non-Final Office Action for U.S. Appl. No. 16/139,887 dated Sep. 4, 2020.
Notice of Allowance for U.S. Appl. No. 16/139,887 dated Dec. 7, 2020.

* cited by examiner

DATA STORAGE METHOD, DATA QUERY METHOD AND APPARATUSES

CROSS REFERENCE TO RELATED APPLICATION

The present application is a continuation of U.S. patent application Ser. No. 16/139,887 filed on Sep. 24, 2018, entitled "Data Storage Method, Data Query Method and Apparatuses," which is based on and claims priority to Chinese Patent Application No. 201710910293.0, filed on Sep. 29, 2017, each of which is incorporated herein by reference in its entirety.

BACKGROUND

In the information age, data have values. For example, if a bank could acquire house purchase records of a client from a house sales center, the bank would be able to better assess the client's credit; if the house sales center can acquire clients' credit scores from the bank, then different sales strategies could be employed for different clients. In the example above, there is apparently a demand for sharing each other's data between the bank and the house sales center. In fact, more and more institutions desire to share data as the value of data becomes increasingly significant.

At present, a data sharing platform is typically used as an intermediary. On one hand, the data sharing platform receives and stores data uploaded by various institutions, and on the other hand, the data sharing platform provides data query services to the institutions. Moreover, as not every institution may have a permission to query all data on the data sharing platform (for example, an institution without a finance license cannot legally query data uploaded by finance institutions; for another example, one institution may enter an agreement only with certain other institutions for querying each other's uploaded data), the data sharing platform further needs to set up an access permission for each institution, such that the data query by the each institution on the data sharing platform complies with legal rules or agreements among institutions. Data sharing among institutions is realized in such a manner.

On the basis of the prior art, it is desired to develop safer and more efficient data storage methods and data query methods.

SUMMARY

Embodiments of the present description provide a data storage method, a data query method and apparatuses to solve the problems that existing data access methods cannot ensure data security and have low data query efficiency.

To solve the above technical problems, the embodiments of the present description are achieved as follows:

A data storage method according to some embodiments of the present description comprises: receiving, from a first blockchain node associated with a blockchain, a query for encrypted data stored in the blockchain, wherein the encrypted data is shared by a second blockchain node and comprises an unencrypted part; determining, through one or more smart contracts stored in the blockchain and based on the unencrypted part, whether the first blockchain node has a permission to decrypt the encrypted data; if the first blockchain node has the permission: sending the encrypted data to an encryption device through the one or more smart contracts to cause the encryption device to decrypt the encrypted data and return data obtained from the decryption to the first blockchain node; determining, through the one or more smart contracts, a reward value to be added to an account of the second blockchain node for sharing the encrypted data; and sending a node identifier of the second blockchain node and the reward value to blockchain nodes of the blockchain, enabling each of the blockchain nodes to store the node identifier and the reward value in the blockchain after the node identifier of the second blockchain node and the reward value are successfully verified through a consensus verification.

In some embodiments, the query for encrypted data comprises a data query condition, and the determining whether the first blockchain node has the permission to decrypt the encrypted data comprises: determining, through the one or more smart contracts and according to the data query condition, whether the unencrypted part comprised in the encrypted data stored in the blockchain satisfies the data query condition.

In some embodiments, if the first blockchain node has the permission, the method further comprises: determining, through the one or more smart contracts, a value to be deducted from an account of the first blockchain node, the value corresponding to the data returned by the encryption device; and sending, through the one or more smart contracts, a node identifier of the first blockchain node and the value to the other blockchain nodes associated with the blockchain to cause each of the other blockchain nodes to store the node identifier of the first blockchain node and the value in the blockchain after successfully performing consensus verification on the node identifier and the value.

In some embodiments, the method further comprises: receiving a refill request from the first blockchain node; sending the refile request to a refill device to cause the refill device to determine a refill certificate according to the refill request and return the refill certificate to the first blockchain node, the refill certificate comprising a value added into an account of the first blockchain node; and sending a node identifier of the first blockchain node and the refill certificate to the other blockchain nodes associated with the blockchain to cause each of the other blockchain nodes to store the node identifier of the first blockchain node and the value in the blockchain after successfully performing consensus verification on the node identifier and the refill certificate.

In some embodiments, the encryption device is a third party device that is separated from the blockchain.

In some embodiments, the method further comprises sending data received from the second blockchain node to the encryption device for encryption; receiving the encrypted data returned by the encryption device; and sending the encrypted data to other blockchain nodes associated with the blockchain to cause each of the other blockchain nodes to store the encrypted data in the blockchain after successfully performing consensus verification on the encrypted data.

In some embodiments, the method further comprises, if the first blockchain node does not have the permission, refusing to send the encrypted data to the encryption device through the one or more smart contracts.

Another data encryption method according to some embodiments of the present description comprises: receiving, from a first blockchain node associated with a blockchain, a query for encrypted data stored in the blockchain; determining, through one or more smart contracts stored in the blockchain, whether the first blockchain node has a permission to decrypt the encrypted data; if the first blockchain node has the permission, determining, through the one or more smart contracts, an expense to be deducted from an account of the first blockchain node; sending, through the one or more smart contracts, a node identifier of the first blockchain node and the expense to the other blockchain nodes associated with the blockchain to cause each of the other blockchain nodes to store the node identifier of the first blockchain node and the expense in the blockchain after successfully performing consensus verification on the node identifier and the expense; receiving, from the first blockchain node, a refill certificate comprising a refill value to be added to an account of the first blockchain node; and sending the node identifier of the first blockchain node and the refill certificate to blockchain nodes of the blockchain, enabling each of the blockchain nodes to store the node identifier and the refill value in the blockchain after the node identifier and the refill value are successfully verified through a consensus verification.

In some embodiments, the encrypted data comprises an unencrypted part, and the query comprises a data query condition, and the determining whether the first blockchain node has the permission to decrypt the encrypted data comprises: determining, through the one or more smart contracts and according to the data query condition, whether the unencrypted part comprised in the encrypted data stored in the blockchain satisfies the data query condition.

In some embodiments, if the first blockchain node has the permission, the method further comprises: determining, through the one or more smart contracts, a reward to be added to an account of a second blockchain node for sharing the encrypted data; and sending, through the one or more smart contracts, the node identifier of the second blockchain node and the reward to the other blockchain nodes associated with the blockchain to cause each of the other blockchain nodes to store the node identifier of the second blockchain node and the reward in the blockchain after successfully performing consensus verification on the node identifier and the reward.

In some embodiments, the method further comprises: if the first blockchain node has the permission, sending the encrypted data to the encryption device for decryption.

Yet another data query method according to some embodiments of the present description comprises: receiving, from a first blockchain node associated with a blockchain, a query for encrypted data stored in the blockchain, wherein the encrypted data comprises an unencrypted part and the query comprises a data query condition; determining, through one or more smart contracts stored in the blockchain, whether the unencrypted part comprised in the encrypted data stored in the blockchain satisfies the data query condition; and if the unencrypted part satisfying the data query condition, sending the encrypted data to an encryption device through the one or more smart contracts to cause the encryption device to decrypt the encrypted data and return data obtained from the decryption to the first blockchain node, wherein the encryption device is a third-party device separated from the blockchain; or if the unencrypted part not satisfying the data query condition, refusing to send the encrypted data to the encryption device.

In some embodiments, the data query condition comprises a key word, and the determining whether the unencrypted part comprised in the encrypted data stored in the blockchain satisfies the data query condition comprises: determining whether the unencrypted part comprises the key word.

In some embodiments, the method further comprises receiving a refill certificate from the first blockchain node, the refill certificate comprising a value added into an account of the first blockchain node; and sending a node identifier of the first blockchain node and the refill certificate to the other blockchain nodes associated with the blockchain to cause each of the other blockchain nodes to store the node identifier of the first blockchain node and the value in the blockchain after successfully performing consensus verification on the node identifier and the refill certificate.

In some embodiments, the method further comprises sending data received from a second blockchain node to the encryption device for encryption; receiving the encrypted data returned from the encryption device; and sending the encrypted data to other blockchain nodes associated with the blockchain to cause each of the other blockchain nodes to store the encrypted data in the blockchain after successfully performing consensus verification on the encrypted data.

From the above technical solutions according to the embodiments of the present description, it can be seen that a blockchain network is formed with each institution acting as a blockchain node in some embodiments of the present description. On one hand, any blockchain node can send its own data to an encryption device for encryption, receive encrypted data returned by the encryption device, and then broadcast the encrypted data to other blockchain nodes to cause each of the other blockchain nodes to store the encrypted data in the blockchain after performing consensus verification on the encrypted data with success; on the other hand, with a smart contract preset in the blockchain, encrypted data within the query permission scope of the blockchain node can be sent to the encryption device for decryption, namely the blockchain node can query data within its permission. According to some embodiments of the present description, first, data shared by blockchain nodes are stored in a distributed manner in a blockchain maintained by the blockchain nodes, and consequently it is difficult to tamper with the data stored in the blockchain, leading to high security; second, the data are encrypted before being stored in the blockchain, and if a blockchain node wants to acquire data, it needs to have its permission verified via a smart contract, and encrypted data that the blockchain node has a permission to acquire will be sent to an encryption device for decryption and ultimately returned to the blockchain node; third, each blockchain node can rapidly acquire data from the blockchain maintained by itself, which improves the efficiency of data acquisition.

BRIEF DESCRIPTION OF THE DRAWINGS

To more clearly describe technical solutions of the present description or the prior art, the accompanying drawings to be used in the description of embodiments or the prior art will be described briefly below. Apparently, the accompanying drawings described below are merely some embodiments of the present description. A person skilled in the art can further obtain other drawings according to these drawings without inventive effort.

DETAILED DESCRIPTION

As described in the Background, an existing data sharing platform can, on one hand, receive and store data uploaded by various institutions, and on the other hand, provide data query services to the institutions. However, such a manner has two problems: one, since the data shared by the institutions are stored by a centralized data sharing platform, data queried by the institutions from the platform would become untrustworthy if someone maliciously tampers with the data stored on the platform; two, the data sharing platform often simultaneously receives data query requests sent from multiple institutions, while the data sharing platform has a limited capacity to process data query requests (it is necessary to perform permission verification on each institution requesting data query). As such, some institutions need to wait in a queue, the data query takes a relatively long time, and the efficiency of data query is low.

In some embodiments of the present description, first, a blockchain network is formed with each institution acting as a blockchain node, and data shared by the blockchain nodes can be stored, after consensus verification by the blockchain nodes is passed, in the blockchain respectively maintained by the blockchain nodes. In such a manner, it would be difficult to tamper with or lose data stored in the blockchain. Second, if a blockchain node wants to query data shared by other blockchain nodes, the blockchain node can simply query the data stored in the blockchain maintained by itself (the data stored in the blockchain maintained by the blockchain nodes are synchronized), and the efficiency of data query can be improved. Third, to manage data query permission of the blockchain nodes, data are encrypted by an encryption device before being stored in the blockchain. Any blockchain node can acquire the encrypted data directly from the blockchain. After the blockchain node passes a permission check on itself via a smart contract, the encrypted data will be sent to the encryption device for decryption and the blockchain node will ultimately receive the plaintext data returned by the encryption device.

To enable a person skilled in the art to better understand the technical solutions of the present description, the technical solutions in the embodiments of the present description will be clearly and completely described below with reference to the accompanying drawings in one or more embodiments of the present description. Apparently, the embodiments described are merely some, rather than all, of embodiments of the present description. All other embodiments obtainable by a person skilled in the art without inventive effort on the basis of the embodiments in the present description shall fall within the scope of the present description.

The technical solutions in the embodiments of the present description will be described in detail below with reference to the accompanying drawings.

Figure 1:
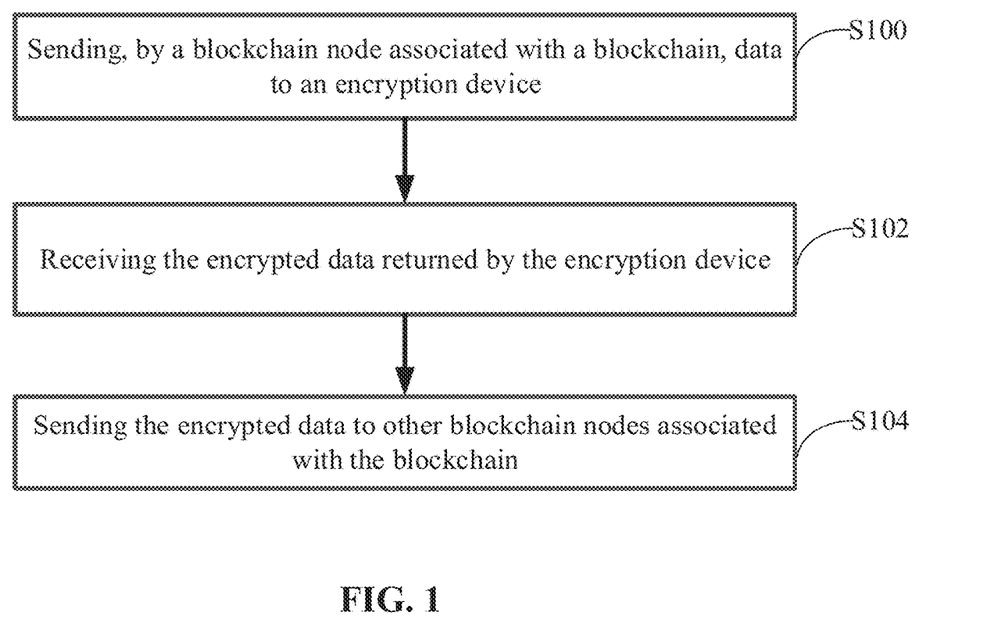
FIG. 1 is a flow chart of a data storage method according to some embodiments of the present description.

FIG. 1 is a flow chart of a data storage method according to some embodiments of the present description, comprising the following steps:

S100: sending, by a blockchain node associated with a blockchain, data to an encryption device.

The flow shown in FIG. 1 is a flow in which a blockchain node stores its own data into a blockchain (i.e., a flow of sharing data).

In some embodiments of the present description, the blockchain node can be a server or a terminal, and in one example, it can be a server of an institution that shares its own data (in the description below, the blockchain node can also be a server of an institution that requests to query data). For example, if a housing rental company wants to share a blacklist of clients in arrears with rent with other institutions, a server of the housing rental company can access a blockchain as a blockchain node and send the blacklist to an encryption device.

In some embodiments of the present description, the encryption device is not a blockchain node, but a device for performing encryption and decryption on data and providing public services to all blockchain nodes. In some embodiments, the encryption device can use a symmetric encryption algorithm to encrypt received data and to decrypt received encrypted data.

It should be noted that, as a third-party device, the encryption device has the function to use a particular encryption algorithm to encrypt received data and to use a decryption algorithm symmetric to the encryption algorithm to decrypt received encrypted data, while no blockchain node is able to learn the encryption algorithm used by the encryption device for encryption and decryption. In other words, no blockchain node can perform decryption without permission on encrypted data stored in the blockchain and maintained by itself.

In summary, if a blockchain node wants to share its own data in some embodiments of the present description, the blockchain node can send the data to an encrypted device to cause the encryption device to encrypt the received data and to return the encrypted data to the blockchain node.

S102: receiving the encrypted data returned by the encryption device.

S104: sending the encrypted data to other blockchain nodes associated with the blockchain.

After a blockchain node sends the encrypted data to other blockchain nodes, the blockchain nodes can perform consensus verification on the encrypted data. If the consensus verification is passed, the blockchain nodes save the encrypted data in the blockchain.

In some embodiments, the consensus verification performed on the encrypted data is actually to perform consensus verification, according to a signature of a blockchain node, on whether an identity and encrypted data of the blockchain node has been tampered with. In one example, the blockchain node generates a summary of encrypted data according to the encrypted data, generates a signature according to the summary by using a signature algorithm (a private key of the blockchain node), and then sends the encrypted data and the signature to other blockchain nodes. Each of the other blockchain nodes that receive the encrypted data and the signature will, on one hand, use a public key of the blockchain node to decrypt the signature (if the decryption is successful, it indicates that the signature is truly generated by the blockchain node using its private key) to obtain the summary; on the other hand, generate a summary according to the received encrypted data, and compare the summary obtained from the decryption and the generated summary. If the comparison result is consistent, it indicates that the encrypted data has not been tampered with during the transmission process. The consensus verification method above is a common legitimacy verification in the field of blockchain technologies and will not be further described.

The reason why it is necessary to send encrypted data (rather than original data) to other blockchain nodes is because a blockchain node may not necessarily have a permission to query all data shared by other blockchain nodes. To control data query permissions of the blockchain nodes, data shared by a blockchain node has to be encrypted before it can be broadcast to other blockchain nodes. In other words, if data shared by a blockchain node is directly sent to other blockchain nodes without encryption, then all other blockchain nodes acquire the data shared by the blockchain node, and it won't be possible to perform permission control, which will be further described below.

Figure 2:
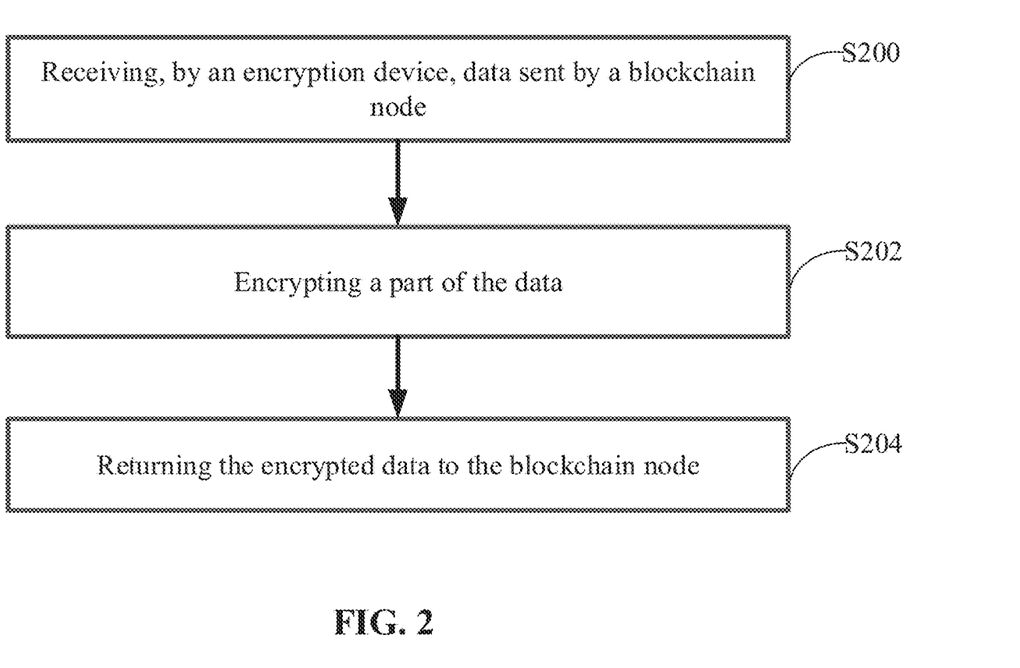
FIG. 2 is a flow chart of a data encryption method according to some embodiments of the present description.

FIG. 2 is a flow chart of a data encryption method according to some embodiments of the present description, comprising the following steps:

S200: receiving, by an encryption device, data sent by a blockchain node.

S202: encrypting a part of the data.

S204: returning the encrypted data to the blockchain node.

In some embodiments of the present description, the encryption device receives data sent by a blockchain node and then only encrypts a part of the data. This is because, in addition to data that has the sharing value, the data shared by a blockchain node typically further comprises some explanatory information (e.g., data categories, sources, summaries, and the like). For example, with regard to the data of a blacklist of clients in arrears with rent shared by a housing rental company, client names, contact information, and ID numbers in the blacklist are the data with value, while the name and institution code of the housing rental company are explanatory information.

Therefore, there are some data in the data shared by a blockchain node that have no need to be confidential to other blockchain nodes. Therefore, the encryption device just needs to encrypt a part of the received data. Moreover, encrypting a part of the data facilitates data query by blockchain nodes, which will be described later. For the purpose of easy description, the encrypted part of each encrypted data will be referred to as transaction data, and the unencrypted part of each encrypted data will be referred to as non-transaction data hereinafter.

Upon receiving the encrypted data, the blockchain node can execute the above step S104, i.e., sending the encrypted data to other blockchain nodes associated with the blockchain for consensus verification and then cause each of the other blockchain nodes to store the encrypted data in the blockchain after performing consensus verification on the encrypted data with success.

Figure 3:
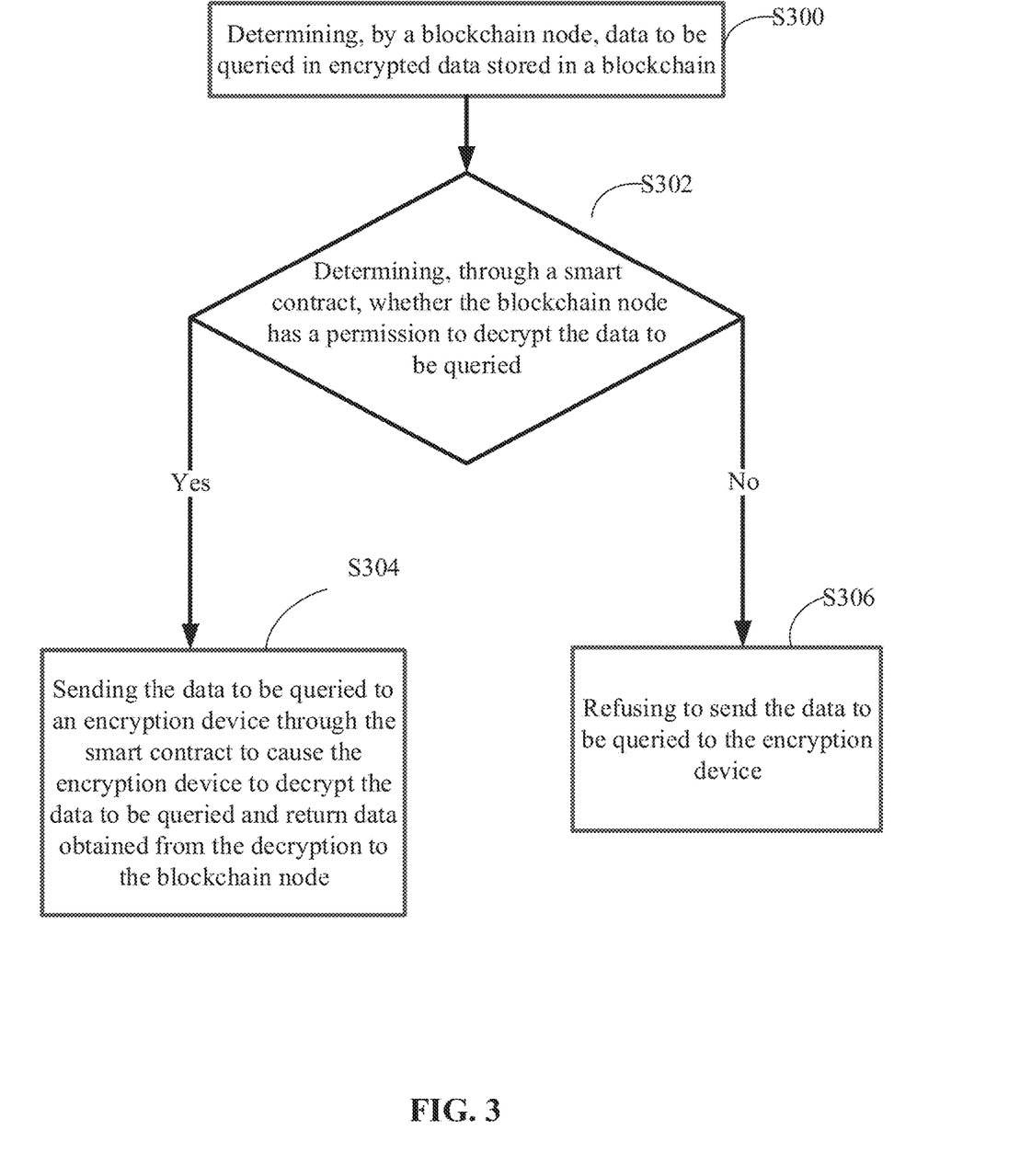
FIG. 3 is a flow chart of a data query method according to some embodiments of the present description.

FIG. 3 is a flow chart of a data acquisition method according to some embodiments of the present description, comprising the following steps:

S300: determining, by a blockchain node (e.g., one of the blockchain nodes associated with a blockchain), data to be queried in encrypted data stored in a blockchain.

The flow shown in FIG. 3 is a flow in which a blockchain node queries the data in a blockchain, and data queried by a blockchain node is often stored by other blockchain nodes in the blockchain in the flow shown in FIG. 1.

In some embodiments of the present description, if the encrypted data stored in the blockchain is partially encrypted (the encrypted data can be obtained through the flow shown in FIG. 2), then a blockchain node that wants to query the data can select data that it wants to query (referred to as data to be queried herein) according to the unencrypted part of each encrypted data (non-transaction data) stored in the blockchain. Apparently, the transaction data in the data to be queried are encrypted, and the data that the blockchain node wants to query will be obtained only after encryption by an encryption device.

In addition, the blockchain node can also determine a data query condition; determine, through a smart contract and according to the data query condition, whether the unencrypted part comprised in each encrypted data stored in the blockchain satisfies the data query condition; if the data query condition is satisfied, use the encrypted data as the encrypted data to be queried; if the data query condition is not satisfied, not use the encrypted data as the encrypted data to be queried. In some embodiments, the data query condition can be a keyword comprised in data to be queried as determined by the blockchain node, data source, the field to which the data belongs, and the like. For example, if a bank wants to acquire a client's house purchase records, the bank can conduct search with a keyword "house purchase record," which can retrieve non-transaction data that contains the above keyword, and the encrypted data comprising the retrieved non-transaction data is the data to be queried.

It is known in the field of blockchain technologies that a smart contract may be essentially code that can be triggered and executed. It is typically preset in a blockchain and it is difficult to tamper with a smart contract stored in a blockchain. Therefore, the smart contract can be used to execute a preset code logic, and the execution process is not interfered by blockchain nodes. In some embodiments of the present description, a smart contract is used in a plurality of different steps to execute different code logics, wherein the different code logics can be executed by different smart contracts or by the same smart contract, which is not limited herein. In summary, the role of a smart contract is to ensure that blockchains executes preset code logics and prevent blockchains from doing evil.

S302: determining, through a smart contract, whether the blockchain node has a permission to decrypt the data to be queried; if the blockchain node has the permission, proceeding to the step S304; if the blockchain node does not have the permission, proceeding to the step S306.

In some embodiments of the present description, attribute information of the data to be queried can be determined through a smart contract according to non-transaction data comprised in the data to be queried, and then it is determined whether attribute information that the blockchain node has a permission to query comprises attribute information of the data to be queried; if yes, the blockchain node has a permission to decrypt the data to be queried; otherwise, the blockchain node does not have a permission to decrypt the data to be queried.

In some embodiments, attribute information of the data to be queried can be information such as source of the data to be queried, data category, and the like, all of which can be determined according to non-transaction data comprised in the data to be queried. The attribute information that the blockchain node has a permission to query is attribute information of preset data that the blockchain node has a permission to query.

S304: sending the data to be queried to an encryption device through the smart contract.

If the blockchain node has a permission to decrypt the data to be queried, the blockchain node can send the data to be queried to an encryption device through the smart contract to cause the encryption device to decrypt the data to be queried and return data obtained from the decryption to the blockchain node. As such, the blockchain node obtains the plaintext data that it desires.

S306: refusing to send the data to be queried to the encryption device.

According to the data storage method shown in FIG. 1, the data encryption method shown in FIG. 2, and the data query method shown in FIG. 3, it can be seen that, first, data shared by blockchain nodes are stored in a distributed manner in a blockchain respectively maintained by the blockchain nodes, and consequently it is difficult to tamper with the data stored in the blockchain, leading to high security; second, the data are encrypted before being stored in the blockchain, and if a blockchain node wants to acquire data, its permission needs to be verified via a smart contract, and encrypted data that the blockchain node has a permission to acquire will be sent to an encryption device for decryption and ultimately returned to the blockchain node; third, each blockchain node can rapidly query data from the blockchain maintained by itself, which improves the efficiency of data query.

Moreover, to encourage institutions to share data, a data trade mechanism can be introduced into the flows shown in FIG. 1 and FIG. 3.

In one example, when a blockchain node shares data in the flow shown in FIG. 1, the blockchain node can determine a first value corresponding to the data through a smart contract, and then send the blockchain node's node identifier and the first value to other blockchain nodes to cause the node identifier and the first value to be stored in the blockchain after a consensus verification on the node identifier and the first value by the blockchain nodes passed.

In some embodiments, the first value can be used to represent a value added into the account of the blockchain node. In other words, the first value is actually an award obtained by the blockchain node for sharing the data. The first value should be determined through a smart contract to prevent a blockchain node from fabricating the first value without authorization. Different data can correspond to different first values, which can be pre-determined in the smart contract according to the needs.

It should be noted that, in the flow shown in FIG. 1, a blockchain node can also determine the first value before sending the encrypted data to other blockchain nodes for consensus verification, and then broadcast its own node identifier, the first value, and the encrypted data together to other blockchain nodes for consensus verification. In summary, in addition to the shared data, a node identifier of the blockchain node that shares data and the first value can also be stored in a blockchain as evidence and for publication if they pass consensus verification, which is equivalent to a balance increase of the account of the blockchain node. The blockchain node can use the balance of its account for consumption to exchange for data shared by other blockchain nodes. As such, the blockchain nodes in a blockchain network form a trade mechanism that encourages data sharing.

Correspondingly, when a blockchain node wants to acquire data shared by other blockchain nodes in the flow shown in FIG. 3, the blockchain node can determine, through a smart contract, a second value corresponding to the data; send the blockchain node's node identifier and the second value to other blockchain nodes to cause each of the other blockchain nodes to store the node identifier and the second value in the blockchain after performing consensus verification on the node identifier and the second value with success.

In some embodiments, the second value can be used to represent a value deducted from the account of the blockchain node. In other words, the second value can be regarded as expenses for querying the data by the blockchain node. The second value corresponding to the data should also be determined through a smart contract. The expenses made by the blockchain node can be deducted from the balance of its account. The blockchain node can broadcast its own node identifier and the second value to other blockchain nodes for consensus verification. If the consensus verification is passed, the node identifier of the blockchain node that acquires the data and the second value will also be stored in a blockchain as evidence and for publication.

Therefore, a blockchain not only stores data shared by institutions, but also publishes records of awards or expenses of the institutions. By checking the transaction records on the blockchain, an account balance can be determined for each institution.

Furthermore, the blockchain node that acquires the data can determine, through a smart contract, a third value corresponding to the data and node identifiers of other blockchain nodes sharing the data; then send the determined node identifiers and the third value to other blockchain nodes to cause each of the other blockchain nodes to store the determined node identifiers and the third value in the blockchain after performing consensus verification on the determined node identifiers and the third value with success.

In some embodiments, the third value can be used to represent a value added into the accounts of other blockchain nodes sharing the data. In other words, the third value can be regarded as an award for a blockchain node because the data shared by the blockchain node is queried.

In some embodiments of the present description, moreover, the blockchain node can send a refill request to a refill device to cause the refill device to determine a refill certificate according to the refill request and return the refill certificate to the blockchain node; the refill certificate comprises a fourth value and the fourth value can be used to represent a value added into the account of the blockchain node; the blockchain node can send its own node identifier and the refill certificate to other blockchain nodes to cause each of the other blockchain nodes to store the node identifier and the fourth value in the blockchain after performing consensus verification on the node identifier and the refill certificate with success.

In some embodiments, the blockchain node can send the fourth value to other blockchain nodes to cause each of the other blockchain nodes to compare the received fourth value and the fourth value contained in the refill certificate; if they are consistent, the verification is passed. It is also feasible that the blockchain node does not send the fourth value to other blockchain nodes, and the blockchain nodes can directly store the fourth value contained in the refill certificate in the blockchain.

To be able to continue acquiring data when a blockchain node does not have enough balance in its account, the blockchain node can refill its account, and the refill result can also be stored in a blockchain as evidence after passing consensus verification performed by the blockchain nodes.

In some embodiments, the refill device is not a blockchain node, but is a device responsible for processing and settling a refill request from a blockchain node and issuing a refill certificate.

Figure 4:
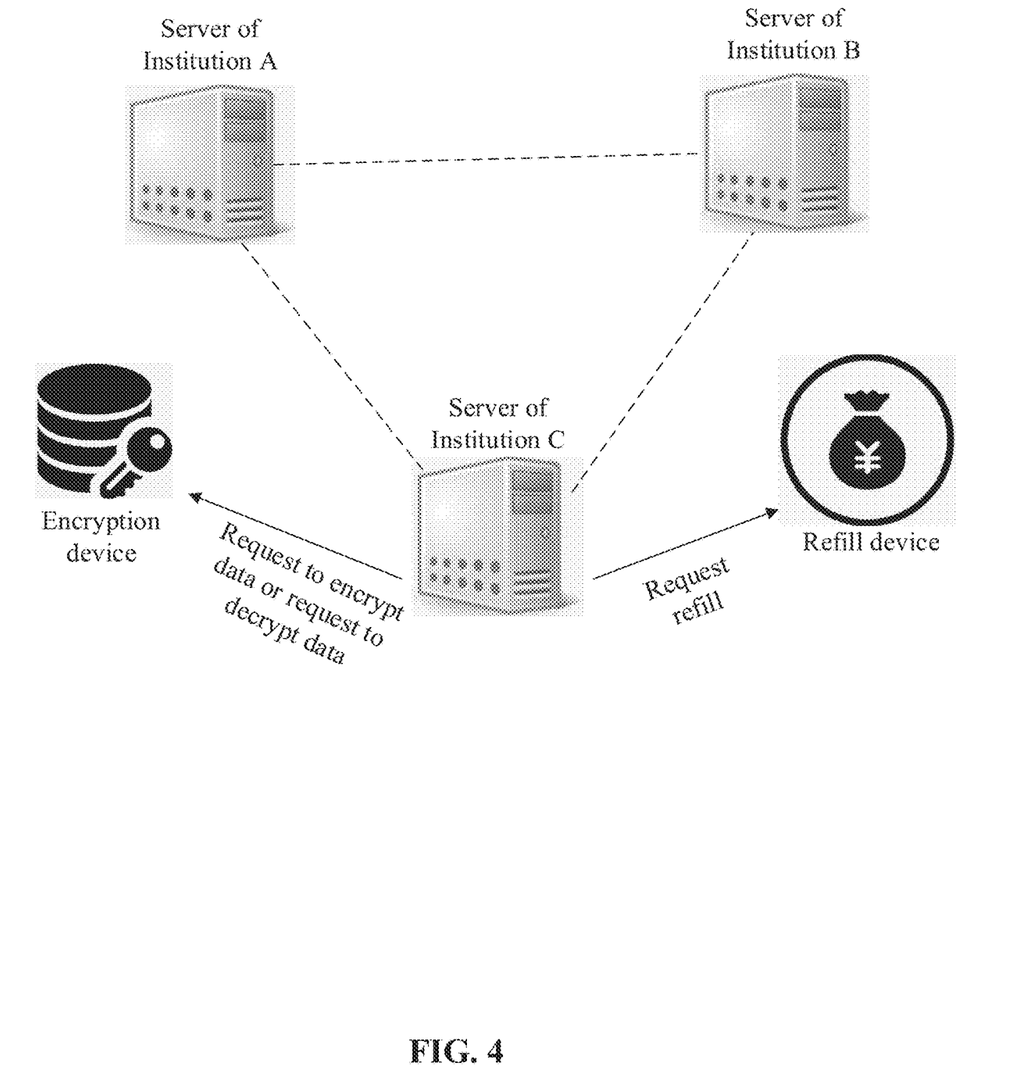
FIG. 4 is a schematic diagram of an architecture of a data storage and query system according to some embodiments of the present description.

FIG. 4 is a schematic diagram of an architecture of a data storage and query system according to some embodiments of the present description. As shown in FIG. 4, servers of institutions A to C act as blockchain nodes and form a blockchain network. The server of each institution maintains a blockchain, and the server of each institution can share data into the blockchain or query data from the blockchain. In the architecture shown in FIG. 4, moreover, there are a third-party encryption device and a refill device. The encryption device is configured to encrypt and decrypt data to prevent an institution from decrypting data in the blockchain without authorization; the refill device is configured to issue a refill certificate to the server of an institution that purchases the fourth value.

Figure 5:
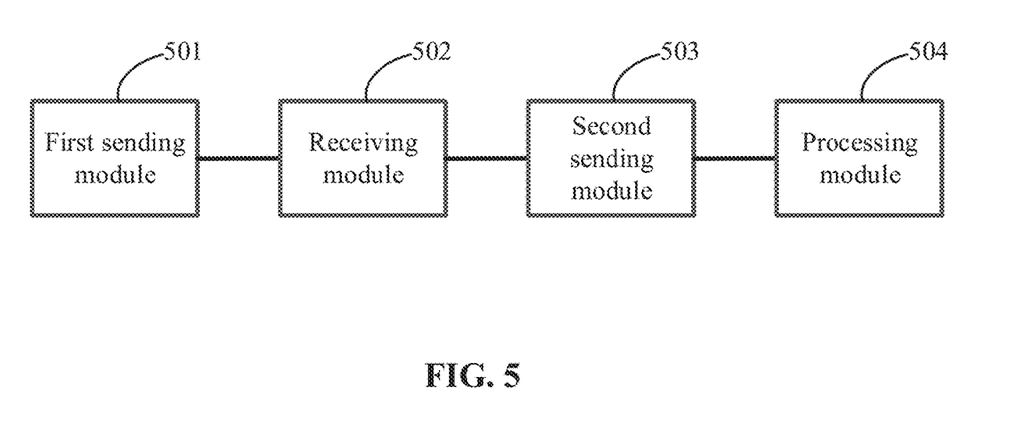
FIG. 5 is a schematic diagram of a data storage apparatus according to some embodiments of the present description.

According to the data storage method shown in FIG. 1, some embodiments of the present description correspondingly provide a data storage apparatus, as shown in FIG. 5, comprising:

a first sending module 501 configured to send data to an encryption device to cause the encryption device to encrypt the received data and return the encrypted data to the blockchain node;

a receiving module 502 configured to receive the encrypted data returned by the encryption device;

a second sending module 503 configured to send the encrypted data to other blockchain nodes to cause each of the other blockchain nodes to store the encrypted data in the blockchain after performing consensus verification on the encrypted data with success.

The apparatus further comprises: a processing module 504 configured to determine a first value corresponding to the data through a smart contract, the first value being used to represent a value added into the account of the apparatus; send its own node identifier and the first value to other blockchain nodes to cause the node identifier and the first value to be stored in the blockchain after a consensus verification on the node identifier and the first value by the blockchain nodes passed.

The various modules and units of the data storage apparatus may be implemented as software instructions. That is, the data storage apparatus may comprise a processor and a non-transitory computer-readable storage medium storing instructions that, when executed by the processor, cause the data storage apparatus to perform various steps and methods of the modules and units described above. In some embodiments, the data storage apparatus may include a computer, a server, a mobile phone, a pad, etc. In some embodiments, the data storage apparatus may act as a blockchain node.

Figure 6:
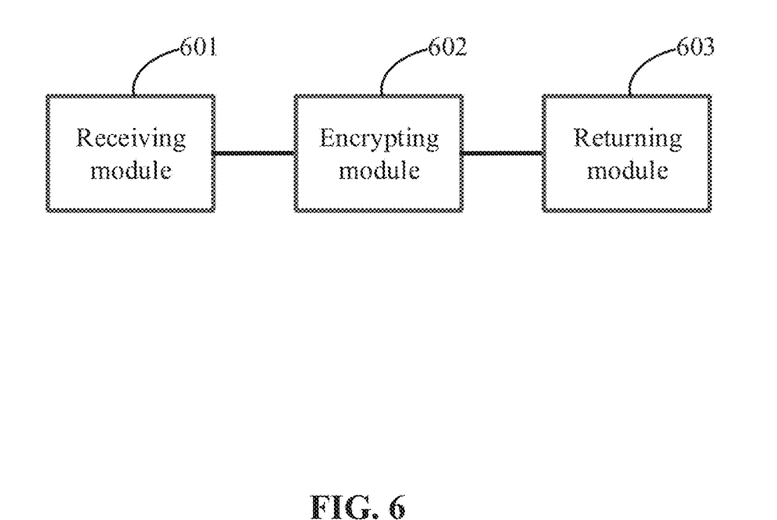
FIG. 6 is a schematic diagram of a data encryption apparatus according to some embodiments of the present description.

According to the data encryption method shown in FIG. 2, some embodiments of the present description correspondingly provide a data encryption apparatus, as shown in FIG. 6, comprising:

a receiving module 601 configured to receive data sent by a blockchain node;

an encrypting module 602 configured to encrypt a part of the data;

a returning module 603 configured to return the encrypted data to the blockchain node to cause the blockchain node to send the encrypted data to other blockchain nodes for consensus verification and then cause each of the other blockchain nodes to store the encrypted data in the blockchain after performing consensus verification on the encrypted data with success.

The various modules and units of the data encryption apparatus may be implemented as software instructions. That is, the data encryption apparatus may comprise a processor and a non-transitory computer-readable storage medium storing instructions that, when executed by the processor, cause the data encryption apparatus to perform various steps and methods of the modules and units described above. In some embodiments, the data encryption apparatus may include a computer, a server, a mobile phone, a pad, etc.

Figure 7:
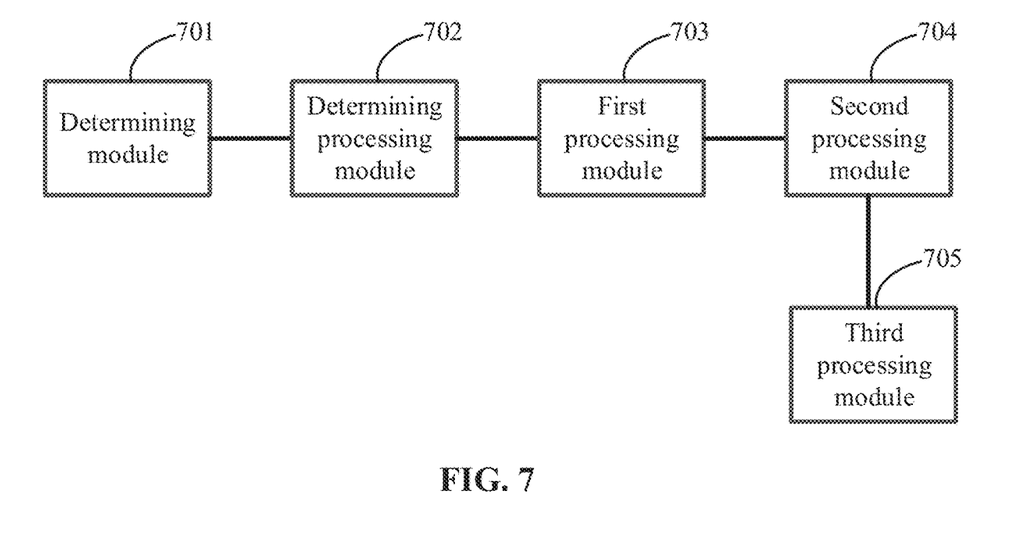
FIG. 7 is a schematic diagram of a data query apparatus according to some embodiments of the present description.

According to the data query method shown in FIG. 3, some embodiments of the present description correspondingly provide a data query apparatus, as shown in FIG. 7, comprising:

a determining module 701 configured to determine data to be queried in encrypted data stored in a blockchain;

a determining and processing module 702 configured to determine, through a smart contract, whether the apparatus has a permission to decrypt the data to be queried; if the blockchain node has the permission, send the data to be queried to an encryption device through the smart contract to cause the encryption device to decrypt the data to be queried and return data obtained from the decryption to the apparatus; if the blockchain node does not have the permission, refuse to send the data to be queried to the encryption device.

Each encrypted data stored in the blockchain comprises an unencrypted part.

The determining module 701 is configured to determine a data query condition; determine, through a smart contract and according to the data query condition, whether the unencrypted part comprised in each encrypted data stored in the blockchain satisfies the data query condition; if the data query condition is satisfied, use the encrypted data as data to be queried; if the data query condition is not satisfied, not use the encrypted data as data to be queried.

The apparatus further comprises: a first processing module 703 configured to, when the blockchain node has a permission to decrypt the data to be queried, determine, through a smart contract, a second value corresponding to the data returned by the encryption device, the second value being used to represent a value deducted from the account of the blockchain node; send, through the smart contract, the blockchain node's node identifier and the second value to other blockchain nodes to cause each of the other blockchain nodes to store the node identifier and the second value in the blockchain after performing consensus verification on the node identifier and the second value with success.

The apparatus further comprises: a second processing module 704 configured to, when the blockchain node has a permission to decrypt the data to be queried, determine, through a smart contract, a third value corresponding to the data and node identifiers of other blockchain nodes sharing the data, the third value being used to represent a value added into the accounts of other blockchain nodes sharing the data; send, through the smart contract, the determined node identifiers and the third value to other blockchain nodes to cause each of the other blockchain nodes to store the determined node identifiers and the third value in the blockchain after performing consensus verification on the determined node identifiers and the third value with success.

The apparatus further comprises: a third processing module 705 configured to send a refill request to a refill device to cause the refill device to determine a refill certificate according to the refill request and return the refill certificate to the blockchain node; the refill certificate comprising a fourth value and the fourth value being used to represent a value added into the account of the blockchain node; send its own node identifier and the refill certificate to other blockchain nodes to cause each of the other blockchain nodes to store the node identifier and the fourth value in the blockchain after performing consensus verification on the node identifier and the refill certificate with success.

The various modules and units of the data query apparatus may be implemented as software instructions. That is, the data query apparatus may comprise a processor and a non-transitory computer-readable storage medium storing instructions that, when executed by the processor, cause the data query apparatus to perform various steps and methods of the modules and units described above. In some embodiments, the data query apparatus may include a computer, a server, a mobile phone, a pad, etc. In some embodiments, the data storage apparatus may act as a blockchain node.

Figure 8:
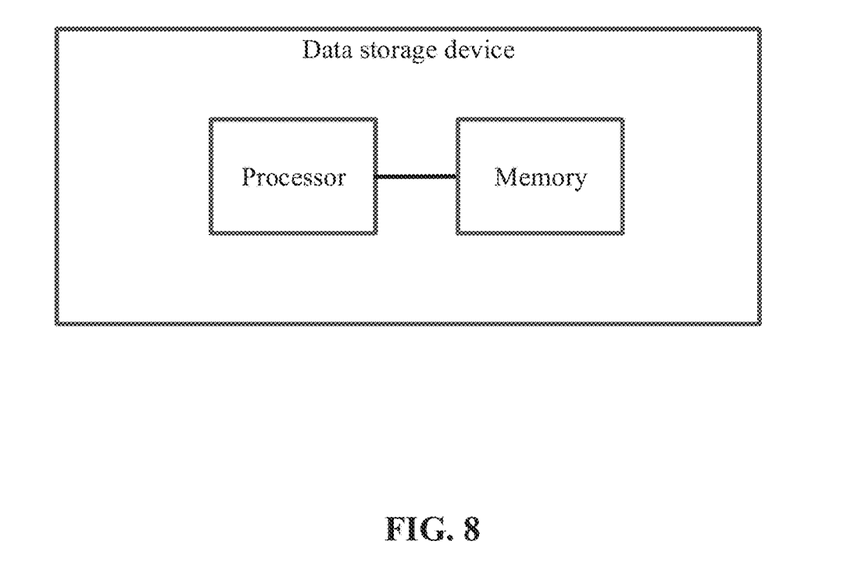
FIG. 8 is a schematic diagram of a data storage device according to some embodiments of the present description.

According to the data storage method shown in FIG. 1, some embodiments of the present description correspondingly provide a data storage device, as shown in FIG. 8, comprising one or more processors and memories, wherein the memories store programs, and being configured to execute the following steps by the one or more processors:

sending data to an encryption device to cause the encryption device to encrypt the received data and return the encrypted data to the blockchain node;

receiving the encrypted data returned by the encryption device;

sending the encrypted data to other blockchain nodes to cause each of the other blockchain nodes to store the encrypted data in the blockchain after performing consensus verification on the encrypted data with success.

Figure 9:
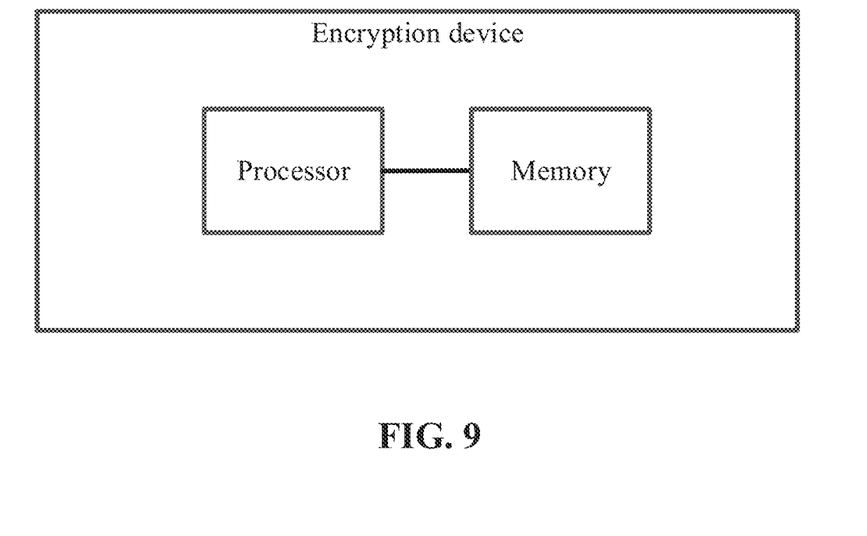
FIG. 9 is a schematic diagram of an encryption device according to some embodiments of the present description.

According to the data storage method shown in FIG. 1, some embodiments of the present description correspondingly provide a data encryption device, as shown in FIG. 9, comprising one or more processors and memories, wherein the memories store programs, and being configured to execute the following steps by the one or more processors:

receiving data sent by a blockchain node;

encrypting a part of the data;

returning the encrypted data to the blockchain node to cause the blockchain node to send the encrypted data to other blockchain nodes for consensus verification and then cause each of the other blockchain nodes to store the encrypted data in the blockchain after performing consensus verification on the encrypted data with success.

Figure 10:
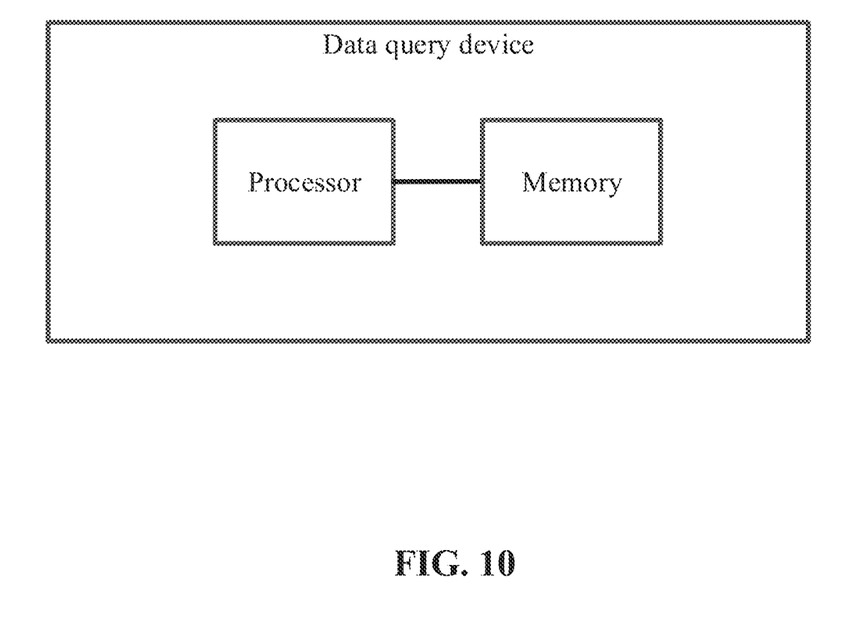
FIG. 10 is a schematic diagram of a data query device according to some embodiments of the present description.

According to the data query method shown in FIG. 2, some embodiments of the present description correspondingly provide a data query device, as shown in FIG. 10, comprising one or more processors and memories, wherein the memories store programs, and being configured to execute the following steps by the one or more processors:

determining data to be queried in encrypted data stored in a blockchain;

determining, through a smart contract, whether the blockchain node has a permission to decrypt the data to be queried;

if the blockchain node has the permission, sending the data to be queried to an encryption device through the smart contract to cause the encryption device to decrypt the data to be queried and return data obtained from the decryption to the blockchain node;

if the blockchain node does not have the permission, refusing to send the data to be queried to the encryption device.

The embodiments in the present description are described in a progressive manner with each embodiment focused on differences from other embodiments, and the embodiments may be mutually referenced for identical or similar parts thereof. For the devices shown in FIGS. 8-10, in particular, the description thereof is relatively simple as they are substantially similar to the method embodiments. The description of the method embodiments may be referenced for related parts thereof.

In the 1990s, an improvement to a technology can be differentiated into a hardware improvement (e.g., an improvement to a circuit structure, such as a diode, a transistor, a switch, and the like) or a software improvement (an improvement to a flow of a method). Along with the technological development, however, many current improvements to method flows can be deemed as direct improvements to hardware circuit structures. Designers almost always obtain a corresponding hardware circuit structure by programming an improved method flow into a hardware circuit. Therefore, it is not that an improvement to a method flow cannot be realized with a hardware module. For example, Programmable Logic Device (PLD) (e.g., Field Programmable Gate Array (FPGA)) is such an integrated circuit that its logic functions are determined by a user through programming the device. A designer programs on his/her own to "integrate" a digital system onto one piece of PLD, who does not need to ask a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language must be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). What are most commonly used right now include VHDL (Very-High-Speed Integrated Circuit Hardware Description Language) and Verilog. A person skilled in the art should also be aware that it would be very easy to obtain a hardware circuit to implement a logic method flow by using the above HDLs to carry out a little bit logic programming on the method flow and program it into an IC.

A controller may be implemented in any proper manner. For example, a controller may be, for example, in a form of a microprocessor or processor, as well as a computer readable medium that stores computer readable program codes (e.g., software or firmware) capable of being executed by the (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of a control logic of a memory. A person skilled in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller and an embedded microcontroller. Therefore, such a controller can be deemed as a hardware part, while apparatuses comprised therein and configured to carry out various functions may also be deemed as a structure inside the hardware part. Alternatively, apparatuses configured to carry out various functions may even be deemed as both software modules to implement a method and a structure inside a hardware part.

The system, apparatus, module, or unit described in the above embodiments may be implemented, for example, by a computer chip or entity or implemented by a product having a function. A typical implementation device is a computer. In one example, a computer may be, for example, a personal computer, a laptop computer, a cellular phone, a camera phone, a smart phone, a personal digital assistant, a medium player, a navigation device, an email device, a game console, a tablet computer, a wearable device, or a combination of any devices in these devices.

For the convenience of description, the above apparatus is divided into various units according to functions for description. Functions of the units may be implemented in one or multiple pieces of software and/or hardware when implementing the present description.

A person skilled in the art should understand that the embodiments of the present invention may be provided as a method, a system, or a computer program product. Therefore, the present invention may be implemented as a complete hardware embodiment, a complete software embodiment, or an embodiment combing software and hardware. Moreover, the present invention may be in the form of a computer program product implemented on one or more computer usable storage media (including, but not limited to, a magnetic disk memory, CD-ROM, an optical memory, and the like) comprising computer usable program codes therein.

The present invention is described with reference to flow charts and/or block diagrams of the method, device (system) and computer program product according to the embodiments of the present invention. A computer program instruction may be used to implement each process and/or block in the flow charts and/or block diagrams and a combination of processes and/or blocks in the flow charts and/or block diagrams. These computer program instructions may be provided for a general-purpose computer, a special-purpose computer, an embedded processor, or a processor of other programmable data processing devices to generate a machine, so that the instructions executed by a computer or a processor of other programmable data processing devices generate an apparatus for implementing a specified function in one or more processes in the flow charts and/or in one or more blocks in the block diagrams.

These computer program instructions may also be stored in a computer readable memory that can instruct a computer or other programmable data processing devices to work in a particular manner, such that the instructions stored in the computer readable memory generate a manufactured article that includes an instruction apparatus. The instruction apparatus implements a specified function in one or more processes in the flow charts and/or in one or more blocks in the block diagrams.

These computer program instructions may also be loaded onto a computer or other programmable data processing devices to cause a series of operational steps to be executed on the computer or other programmable devices to generate computer-implemented processing. Therefore, the instructions executed on the computer or other programmable devices provide steps for implementing a specified function in one or more processes in the flow charts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs), or other optical memories, cassettes, cassette, and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including", "comprising" or any other variants thereof intend to encompass a non-exclusive inclusion, such that a process, method, commodity or device comprising a series of elements not only comprises these elements, but also comprises other elements that are not specifically listed, or further comprises elements that are inherent to the process, method, commodity or device. When there is no further restriction, elements defined by the statement "comprising one . . . " does not exclude that a process, method, commodity or device comprising the above elements further comprises additional identical elements.

A person skilled in the art should understand that the embodiments of the present description may be provided as a method, a system, or a computer program product. Therefore, the present description may be implemented as a complete hardware embodiment, a complete software embodiment, or an embodiment combing software and hardware. Moreover, the present description may be in the form of a computer program product implemented on one or more computer usable storage media (including, but not limited to, a magnetic disk memory, CD-ROM, an optical memory, and the like) including computer usable program codes.

The present description may be described in a regular context of a computer executable instruction that is executed by a computer, such as a program module. Generally, the program module comprises a routine, a program, an object, a component, a data structure, and the like for executing a particular task or implementing a particular abstract data type. The present description may also be practiced in distributed computing environments. In these distributed computing environments, remote processing devices connected via communication networks carry out tasks. In the distributed computing environments, a program module can be located in local and remote computer storage media, including storage devices.

Only embodiments of the present description are described above, which are not used to limit the present description. To a person skilled in the art, the present description may have various modifications and changes. Any modification, equivalent substitution or improvement made within the spirit and principle of the present description shall be encompassed by the claims of the present description.

The invention claimed is:

1. A computer-implemented method, comprising:
receiving, from a first blockchain node associated with a blockchain, a query for encrypted data stored in the blockchain, wherein the encrypted data is shared by a second blockchain node and comprises an unencrypted part;
determining, through one or more smart contracts stored in the blockchain and based on the unencrypted part, whether the first blockchain node has a permission to decrypt the encrypted data;
if the first blockchain node has the permission:
sending the encrypted data to an encryption device through the one or more smart contracts to cause the encryption device to decrypt the encrypted data and return data obtained from the decryption to the first blockchain node;
determining, through the one or more smart contracts, a reward value to be added to an account of the second blockchain node for sharing the encrypted data; and
sending a node identifier of the second blockchain node and the reward value to blockchain nodes of the blockchain, enabling each of the blockchain nodes to store the node identifier of the second blockchain node and the reward value in the blockchain after the node identifier of the second blockchain node and the reward value are successfully verified through a consensus verification.

2. The method according to claim 1, wherein the query for encrypted data comprises a data query condition, and
the determining whether the first blockchain node has the permission to decrypt the encrypted data comprises:
determining, through the one or more smart contracts and according to the data query condition, whether the unencrypted part comprised in the encrypted data stored in the blockchain satisfies the data query condition.

3. The method according to claim 1, wherein, if the first blockchain node has the permission, the method further comprises:
determining, through the one or more smart contracts, a value to be deducted from an account of the first blockchain node, the value corresponding to the data returned by the encryption device; and
sending, through the one or more smart contracts, a node identifier of the first blockchain node and the value to other blockchain nodes associated with the blockchain to cause each of the other blockchain nodes to store the node identifier of the first blockchain node and the value in the blockchain after successfully performing consensus verification on the node identifier of the first blockchain node and the value.

4. The method according to claim 1, the method further comprising:
receiving a refill request from the first blockchain node;
sending the refill request to a refill device to cause the refill device to determine a refill certificate according to the refill request and return the refill certificate to the first blockchain node, the refill certificate comprising a value added into an account of the first blockchain node; and
sending a node identifier of the first blockchain node and the refill certificate to other blockchain nodes associated with the blockchain to cause each of the other blockchain nodes to store the node identifier of the first blockchain node and the value in the blockchain after successfully performing consensus verification on the node identifier of the first blockchain node and the refill certificate.

5. The method according to claim 1, wherein the encryption device is a third party device that is separated from the blockchain.

6. The method according to claim 1, the method further comprising:
sending data received from the second blockchain node to the encryption device for encryption;
receiving the encrypted data returned by the encryption device; and
sending the encrypted data to other blockchain nodes associated with the blockchain to cause each of the other blockchain nodes to store the encrypted data in the blockchain after successfully performing consensus verification on the encrypted data.

7. The method according to claim 6, the method further comprising:
if the first blockchain node does not have the permission, refusing to send the encrypted data to the encryption device through the one or more smart contracts.

8. A computer-implemented method, comprising:
receiving, from a first blockchain node associated with a blockchain, a query for encrypted data stored in the blockchain;
determining, through one or more smart contracts stored in the blockchain, whether the first blockchain node has a permission to decrypt the encrypted data;
if the first blockchain node has the permission, determining, through the one or more smart contracts, an expense to be deducted from an account of the first blockchain node;
sending, through the one or more smart contracts, a node identifier of the first blockchain node and the expense to other blockchain nodes associated with the blockchain to cause each of the other blockchain nodes to store the node identifier of the first blockchain node and the expense in the blockchain after successfully performing consensus verification on the node identifier of the first blockchain node and the expense;
receiving, from the first blockchain node, a refill certificate comprising a refill value to be added to an account of the first blockchain node; and
sending the node identifier of the first blockchain node and the refill certificate to blockchain nodes of the blockchain, enabling each of the blockchain nodes to store the node identifier of the first blockchain node and the refill value in the blockchain after the node identifier of the first blockchain node and the refill value are successfully verified through a consensus verification.

9. The method of claim 8, wherein the encrypted data comprises an unencrypted part, and the query comprises a data query condition, and
the determining whether the first blockchain node has the permission to decrypt the encrypted data comprises:
determining, through the one or more smart contracts and according to the data query condition, whether the unencrypted part comprised in the encrypted data stored in the blockchain satisfies the data query condition.

10. The method of claim 8, wherein if the first blockchain node has the permission, the method further comprises:
determining, through the one or more smart contracts, a reward to be added to an account of a second blockchain node for sharing the encrypted data; and sending, through the one or more smart contracts, the node identifier of the second blockchain node and the reward to the other blockchain nodes associated with the blockchain to cause each of the other blockchain nodes to store the node identifier of the second blockchain node and the reward in the blockchain after successfully performing consensus verification on the node identifier of the second blockchain node and the reward.

11. The method of claim 8, wherein the encryption device is a third party device that is separated from the blockchain.

12. The method according to claim 8, the method further comprising:
sending data received from a second blockchain node to an encryption device to cause the encryption device to encrypt the data to form the encrypted data;
receiving the encrypted data returned by the encryption device; and
sending the encrypted data to other blockchain nodes associated with the blockchain to cause each of the other blockchain nodes to store the encrypted data in the blockchain after successfully performing consensus verification on the encrypted data.

13. The method according to claim 8, the method further comprising:
if the first blockchain node has the permission, sending the encrypted data to an encryption device for decryption.

14. A computer-implemented method, comprising:
receiving, from a first blockchain node associated with a blockchain, a query for encrypted data stored in the blockchain, wherein the encrypted data comprises an unencrypted part and the query comprises a data query condition;
determining, through one or more smart contracts stored in the blockchain, whether the unencrypted part comprised in the encrypted data stored in the blockchain satisfies the data query condition; and
if the unencrypted part satisfying the data query condition, sending the encrypted data to an encryption device through the one or more smart contracts to cause the encryption device to decrypt the encrypted data and return data obtained from the decryption to the first blockchain node, wherein the encryption device is a third-party device separated from the blockchain; or
if the unencrypted part not satisfying the data query condition, refusing to send the encrypted data to the encryption device.

15. The method according to claim 14, if the unencrypted part satisfies the data query condition, the method further comprising:
determining, through the one or more smart contracts, a reward value to be added to an account of a second blockchain node for sharing the encrypted data; and
sending a node identifier of the second blockchain node and the reward value to blockchain nodes of the blockchain, enabling each of the blockchain nodes to store the node identifier of the second blockchain node and the reward value in the blockchain after the node identifier of the second blockchain node and the reward value are successfully verified through a consensus verification.

16. The method according to claim 14, wherein the data query condition comprises a key word, and
the determining whether the unencrypted part comprised in the encrypted data stored in the blockchain satisfies the data query condition comprises:
determining whether the unencrypted part comprises the key word.

17. The method according to claim 14, if the unencrypted part satisfies the data query condition, the method further comprising:
determining, through the one or more smart contracts, a value to be deducted from an account of the first blockchain node, the value corresponding to the data returned by the encryption device; and
sending, through the one or more smart contracts, a node identifier of the first blockchain node and the value to other blockchain nodes associated with the blockchain to cause each of the other blockchain nodes to store the node identifier of the first blockchain node and the value in the blockchain after successfully performing consensus verification on the node identifier of the first blockchain node and the value.

18. The method according to claim 14, the method further comprising:
receiving a refill certificate from the first blockchain node, the refill certificate comprising a value added into an account of the first blockchain node; and
sending a node identifier of the first blockchain node and the refill certificate to other blockchain nodes associated with the blockchain to cause each of the other blockchain nodes to store the node identifier of the first blockchain node and the value in the blockchain after successfully performing consensus verification on the node identifier of the first blockchain node and the refill certificate.

19. The method according to claim 14, wherein the encryption device is a third party device that is separated from the blockchain.

20. The method according to claim 14, the method further comprising:
sending data received from a second blockchain node to the encryption device for encryption;
receiving the encrypted data returned from the encryption device; and
sending the encrypted data to other blockchain nodes associated with the blockchain to cause each of the other blockchain nodes to store the encrypted data in the blockchain after successfully performing consensus verification on the encrypted data.

* * * * *